United States Patent [19]

Heit

[11] 3,779,883
[45] Dec. 18, 1973

[54] PENTAERYTHRITOL PURIFICATION PROCESS

[75] Inventor: Allyn H. Heit, San Mateo, Calif.

[73] Assignee: Sybron Corporation, Rochester, N.Y.

[22] Filed: Nov. 3, 1972

[21] Appl. No.: 303,383

[52] U.S. Cl............................... 204/180 P, 204/72
[51] Int. Cl............................................ B01d 13/02
[58] Field of Search.................. 204/180 P, 301, 72

[56] References Cited
UNITED STATES PATENTS

| | | | |
|---|---|---|---|
| 2,694,680 | 11/1954 | Katz et al. | 204/180 P |
| 2,865,822 | 12/1958 | Murphy | 204/72 |

Primary Examiner—John H. Mack
Assistant Examiner—A. C. Prescott
Attorney—Theodore B. Roessel

[57] ABSTRACT

Formate salts such as sodium formate are removed from a pentaerythritol solution in an electrodialysis unit divided by a stack of alternating cation and anion permselective membranes into an anode compartment, a series of alternating concentration and dilution compartments, and a cathode compartment. The anode compartment is contiguous to a concentration compartment and, preferably, the cathode compartment is contiguous to a dilution compartment. The impure pentaerythritol solution passes through the dilution compartments; an electrically conductive liquid, preferably a dilute solution of the impurity in the pentaerythritol solution, passes through the concentration compartments; and an electrolyte containing a salt, preferably one with the same cation as the formate salt in the pentaerythritol solution, is circulated from a common tank through the anode and cathode compartments and back to the tank.

12 Claims, 1 Drawing Figure

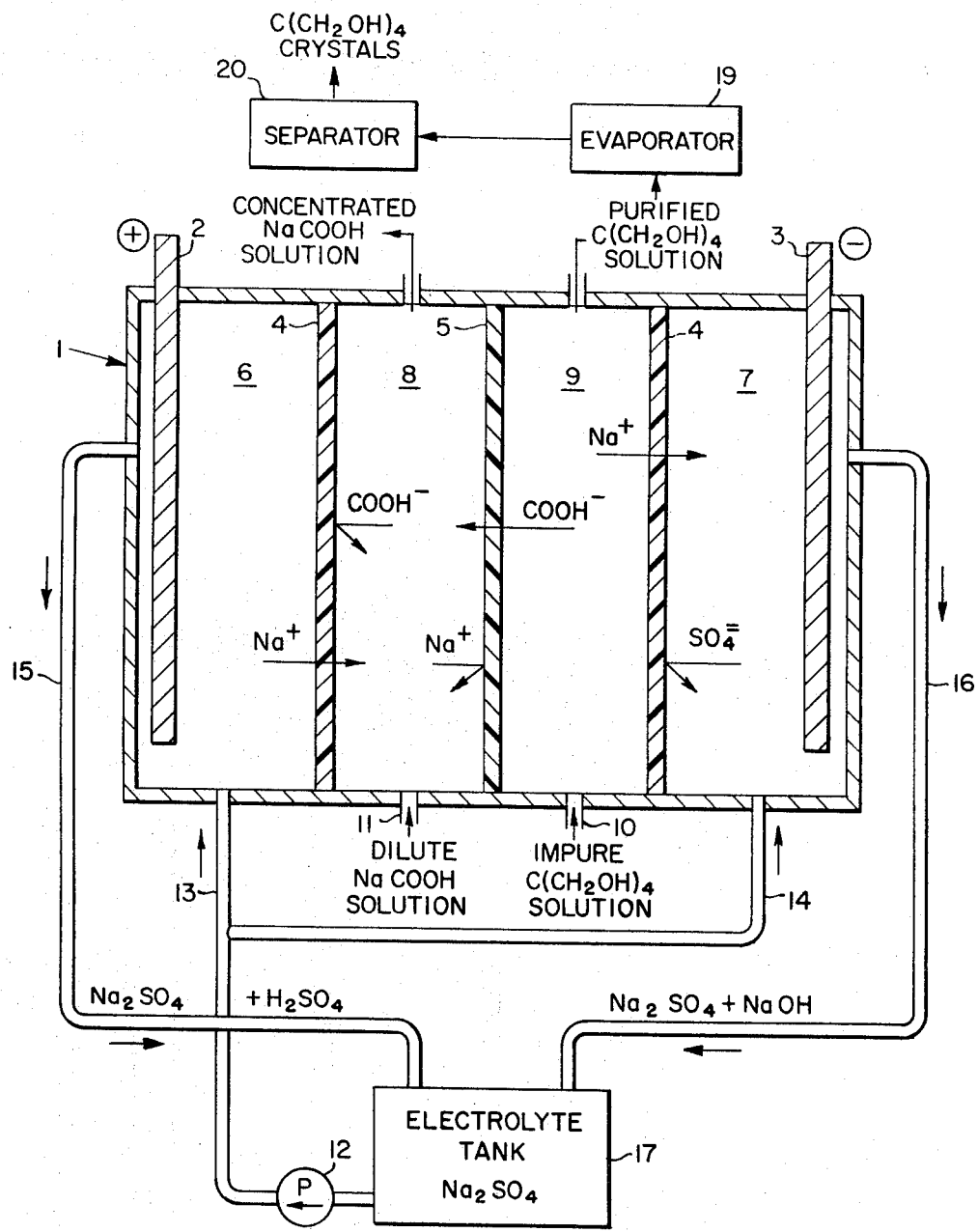

PENTAERYTHRITOL PURIFICATION PROCESS

BACKGROUND OF THE INVENTION

This invention relates to a process for purifying a pentaerythritol solution, and more particularly to a process for removing formate salts such as sodium formate or calcium formate from an aqueous solution of pentaerythritol by electro-dialysis Pentaerythritol is normally produced by reacting formaldehyde and acetaldehyde in the presence of an alkaline catalyst such as sodium hydroxide or calcium hydroxide. The pentaerythritol is recovered in an aqueous solution that also contains formate salts such as sodium formate or calcium formate, depending on the alkaline catalyst used.

The pentaerythritol solution is usually purified in several evaporation and fractional crystallization steps. Large amounts of water are required to remove residual formate salts from the pentaerythritol crystals. This process is relatively expensive because of the multiplicity of steps and the amounts of water required.

A process for purifying pentaerythritol solution by electrodialysis is disclosed in U. S. Pat. No. 2,865,822 to C. R. Murphy. In this process, a three or four compartment electrodialysis unit is used to produce formic acid and sodium hydroxide in addition to purified pentaerythritol. This process reduces the number of evaporation and fractional crystallization steps needed to purify the pentaerythritol, but is has several drawbacks. The process is limited to a three or four compartment stack because recovery of sodium hydroxide and formic acid are major goals. As a result, the process is relatively inefficient from an electrical standpoint because of the high voltage drop across the electrode compartments. The voltage drop is particularly high in the anode compartment because of the oxidation of formic acid and the low conductance of formic acid.

Another drawback of this process is the fact that sodium hydroxide and formic acid are corrosive. Thus, expensive materials must be used in the cell. In addition, formic acid is sensitive to the highly oxidizing conditions that exist in the anode compartment and is likely to break down into undesirable by-products. These drawbacks can be alleviated somewhat by using the four cell configuration shown in the patent. However, this configuration reduces the electrical efficiency of the process still further; and, since formic acid is only weakly ionized, it will tend to diffuse into the anode compartment, accumulate there, and create the same problems that the four cell arrangement was designed to eliminate.

SUMMARY OF THE INVENTION

It is an object of this invention to provide an electrodialysis process for the purification of pentaerythritol in which the voltage drop across the electrode compartments is minimized.

Another object of this invention is the provision of an electrodialysis process for separating a solution of pentaerythritol and formate salts into a solution of pentaerythritol and a solution of formate salts with a minimum development of either acidity or basicity.

A further object of this invention is to provide an electrodialysis process for purification of pentaerythritol in which a salt which will not engender by-products because of oxidation or reduction sensitivity is used as a common electrolyte for both the anode and the cathode compartments.

A still further object is to provide an electrodialysis process for purifying pentaerythritol in which spent anolyte is reacted with spent catholyte to produce fresh electrolyte.

This invention minimizes the formation of formic acid by using a dilute salt solution as the anolyte in an electrodialysis unit with a cation permselective membrane on the anode end of a stack of alternating cation and anion permselective membranes that divide the space between the anode compartment and the cathode compartment into alternating concentration and dilution compartments. Under the influence of electric current, cations of the anolyte salt migrate through the cation permselective membrane next to the anode compartment into the next compartment which, because of the membrane arrangement, is a concentration compartment. In this compartment these cations unite with formate ions moving through the anion permselective membrane that separates this concentration compartment from the adjacent dilution compartment, which contains pentaerythritol solution to be purified.

The hydrogen ions generated at the anode combine with the free anions in the anolyte. This, and the fact that formate ions are kept out of the anode compartment by the adjoining cation permselective membrane, minimize the generation of formic acid. This reduces the voltage drop in and the corrosiveness of the anolyte.

Since generation of formic acid is not a goal of this process, an electrodialysis unit with a large number of dilution and concentration compartments may be used. This reduces the importance of the voltage drop in the electrode compartments and makes the process more efficient electrically. In addition, this minimizes the number of cells in which corrosive conditions tend to develop.

In the preferred embodiment of this invention, the electrodialysis unit has a cation permselective membrane on both ends of the membrane stack, and a common electrolyte containing a salt with the same cation as the formate salt in the pentaerythritol solution is used in both the anode and the cathode compartments. Under these conditions, there is no transfer of anions from either the catholyte or the anolyte and cations from the formate salt in the pentaerythritol solution are transferred to the catholyte at the same rate at which cations are transferred from the anolyte. Thus, the total quantity of salt in the electrolyte remains constant and fresh electrolyte can be generated by mixing the spent catholyte and the spent anolyte. Thus, there is no continual accumulation of acidity or basicity. In addition, the regeneration eliminates the need for a supply of fresh electrolyte.

Other objects and advantages of this invention will be apparent from the following description.

DRAWING

The attached drawing is a schematic flow diagram of a process for removing sodium formate from a solution of pentaerythritol.

DETAILED DESCRIPTION

The pentaerythritol solution is purified in an electrodialysis unit 1, with an anode 2 at one end and a cathode 3 at the other end. The unit is divided by alternating cation permselective membranes 4 and anion permselective membranes 5 into an anode compartment 6, a cathode compartment 7, a concentration compartment 8 and a dilution compartment 9. There is a cation permselective membrane at the anode end of the membrane stack, thus, there is a concentration compartment contiguous to anode chamber 6. In the preferred embodiment shown in the drawing there is is a cation permselective membrane on the cathode end of the stack as well. Thus, there is a dilution compartment contiguous to the cathode compartment 7.

Although the electrodialysis unit shown in the drawing has one dilution and one concentration compartment, most units will have many more, because the effects of the electrode compartments are reduced in proportion to the number of compartments in the unit. A typical unit might contain 200 or more membranes.

The impure pentaerythritol solution flows through inlet 10 into dilution compartment 9. A conductive liquid, which is preferably a dilute solution of the formate salt to be removed from the pentaerythritol solution, passes through inlet 11 into concentration chamber 8. Pump 12 forces electrolyte through lines 13 and 14 to the anode compartment 6 and the cathode compartment 7. The electrolyte is a dilute conductive solution of a salt, preferably one with the same cation as the impurity in the pentaerythritol solution. In the process shown, wherein the formate salt is sodium formate, salts such as sodium sulfate and disodium phosphate may be used in the electrolyte. The preferred electrolyte is a 0.1 to 0.3 molar solution of sodium sulfate, however, other salts which are not sensitive to the oxidizing and reducing condition in the anode and cathode compartments may be used. Under the influence of electric current, sodium ions pass from anode compartment 6 and dilution compartment 9 through the cation permselective membranes 4 into concentration chamber 8 and cathode compartment 7. Formate ions from the dilution compartment 9 migrate through the anion permselective membrane 5 into concentration compartment 8. As a result, the sodium formate concentration in the solution in dilution compartment 9 decreases and the soidum formate concentration in the liquid in concentration compartment 8 increases.

Hydrogen ions are generated at the anode, but they

The sodium ions that migrate to the cathode compartment react with the hydroxyl ions generated at the cathode to form sodium hydroxide. At the same time, the sulfate ions which are left behind in the anode compartment by the migration of sodium ions react with the hydrogen ions generated at the anode to form sulfuric acid. The rate at which sodium ions migrate from the anode compartment into the nearest concentration compartment matches the rate at which sodium ions migrate into the cathode compartment from the nearest dilution compartment. Since there is no migration of sulfate ions from either the anode or the cathode compartments, the total quantity of sodium and sulfate ions in the electrolyte remains constant, and stoichiometric amounts of sodium hydroxide and sulfuric acid are formed in the electrode compartments. The spent electrolyte is withdrawn from these compartments through lines 15 and 16 and mixed in tank 17, where the sodium hydroxide and sulfuric acid react to form sodium sulfate, which is recirculated to the anode and cathode compartments. Since stoichiometric quantities of sodium hydroxide and sulfuric acid are formed in the electrode compartments, the quantity and concentration of sodium sulfate in tank 17 may be maintained simply by adjusting the flow rates to and from the electrode compartments and adding water to tank 17 to replace the water lost through electrolysis at the electrodes and the water transferred out of the anode compartment 6 with the sodium ions.

In order to avoid accumulation of gas and/or concentration polarization in the electrolyte compartments, it is usually desirable to circulate the electrolyte through these compartments at a relatively rapid rate. As a result, the anolyte does not become very acidic and the catholyte does not become very basic. Thus, the anolyte and catholyte are relatively non-corrosive and inexpensive materials can be used in the electrode compartments.

The amount of purification which is achieved in a single stage unit of the type shown in the drawing may be controlled by adjusting current density, the flow rate and/or the length of the path traveled by the solution in passing through the dilution compartments. With typical impure solutions, which may contain 50 to 150 grams of pentaerythritol per liter and 40 to 130 grams of sodium formate per liter, up to 10 percent of the sodium formate may be removed in a single pass. Sodium formate concentrations as low as 0.3 gm/liter can be achieved by passing the pentaerythritol solution through several electrodialysis stages of the type shown in the drawing, or in a batch operation, by recirculating the solution through a single unit.

After the desired purity is achieved, the pentaerythritol solution passes to one or more evaporators 19 wherein water vapor is driven off and one or more separators 20, which may be centrifuges, filters or the like, where crystalline pentaerythritol is recovered. The evaporation and crystallization steps are much simpler than those employed in conventional pentaerythritol purification processes because most of the sodium formate has been removed by electrodialysis.

The concentration of sodium formate in concentration compartment 8 is maintained at the desired level by adjusting the rate at which sodium formate solution is withdrawn from the compartment. Typically, a solution containing up to 90 to 100 gms per liter of sodium formate is withdrawn from the concentration compartment at a rate equal to the volume increase of the concentrate liquor.

Although the foregoing description is of a continuous process, this invention may be practiced in batch processes as well. Many other modifications may be made to the process described above, which is merely illustrative and is not intended to limit the scope of this invention.

I claim:

1. In a process for removing a formate salt from a solution of pentaerythritol in an electrodialysis unit with an anode compartment and a cathode compartment separated by a stack of alternating cation and anion permselective membranes, there being a cation permselective membrane at the anode end of the stack; the improvement wherein an electrolyte comprising a dilute salt solution is circulated through the anode compartment.

2. A process according to claim 1 wherein the electrolyte salt has the same cation as the formate salt.

3. A process according to claim 2 wherein the same dilute salt solution is circulated through the anode compartment and the cathode compartment.

4. A process according to claim 3 wherein spent anolyte and spent catholyte are mixed to form fresh electrolyte.

5. A process according to claim 4 wherein the formate salt is sodium formate and the electrolyte is sodium sulfate or disodium phosphate.

6. A process according to claim 5 wherein the electrolyte salt is sodium sulfate.

7. A process for removing a formate salt from a pentaerythritol solution in an electrodialysis unit with an anode compartment and a cathode compartment separated by a stack of alternating cation and anion permselective membranes that define alternating concentration and dilution compartments, with a cation permselective membrane at both ends of the stack, comprising:
 a. placing the pentaerythritol solution in the dilution compartments;
 b. placing an electrically conductive liquid in the concentration compartments;
 c. placing a dilute electrolyte containing a salt with the same cation as the formate salt in said anode and cathode compartments, and
 d. imposing an electric current across the unit, whereby anions of the formate salt pass through the anion permselective membranes into the concentration compartment, cations of the formate salt pass through the cation permselective membranes into the concentration compartments and into the cathode compartment, and cations of the salt in the electrolyte pass from the anode compartment into the nearest concentration chamber.

8. A process according to claim 7 wherein the formate salt is sodium formate.

9. A process according to claim 8 wherein the salt in the electrolyte is sodium sulfate or disodium phosphate.

10. A process according to claim 8 wherein the salt in the electrolyte is sodium sulfate.

11. A process according to claim 7 wherein spent anolyte and spent catholyte are mixed and recirculated to the anode and cathode compartments.

12. A process according to claim 7 wherein the electrically conductive solution in the concentration chambers is a dilute solution of the formate salt to be removed from the pentaerythritol solution.

* * * * *

UNITED STATES PATENT OFFICE
CERTIFICATE OF CORRECTION

Patent No. 3,779,883      Dated December 18, 1973

Inventor(s) Allyn H. Heit

It is certified that error appears in the above-identified patent and that said Letters Patent are hereby corrected as shown below:

Column 1, line 8, change "electro-dialysis" to "electrodialysis.".

Column 3, line 46, after "they" insert -- combine with the sulfate ions freed by the transfer of sodium ions out of the anolyte. Thus, there is essentially no hydrogen ion available to form formic acid in concentration compartment 8. There is even less chance of generating formic acid in units with more than one concentration cell, because the cations entering additional concentration compartments come from dilution compartments instead of from the anode compartment. --

Column 5, line 8, after "electrolyte" insert -- salt --.

Signed and sealed this 23rd day of July 1974.

(SEAL)
Attest:
McCOY M. GIBSON, JR.
Attesting Officer

C. MARSHALL DANN
Commissioner of Patents